United States Patent [19]

Ohi et al.

[11] 3,989,921
[45] Nov. 2, 1976

[54] METHOD AND APPARATUS FOR NON-CONSUMABLE ELECTRODE TYPE AUTOMATIC ARC WELDING

[75] Inventors: Atsushi Ohi, Fujisawa; Toshio Arai, Kamakura; Akihiko Ihochi, Odawara; Hironosuke Kada, Kamakura; Teruyoshi Sekino, Fujisawa; Kenichi Akahori, Kamakura, all of Japan

[73] Assignee: Kobe Steel Ltd., Kobe, Japan

[22] Filed: Mar. 28, 1974

[21] Appl. No.: 455,908

[30] Foreign Application Priority Data

Mar. 28, 1973   Japan.............................. 48-35273

[52] U.S. Cl.............................. 219/131 F; 219/125 R
[51] Int. Cl.².................................................. B23K 9/12
[58] Field of Search.......... 219/124, 125 R, 125 PL, 219/131 F, 131 R

[56] References Cited
UNITED STATES PATENTS

| | | |
|---|---|---|
| 2,223,177 | 11/1940 | Jones................................ 219/131 F |
| 2,636,102 | 4/1953 | Lobosco......................... 219/131 F |
| 3,262,006 | 7/1966 | Sciaky et al................. 219/125 R X |
| 3,443,057 | 5/1969 | Allen et al. ..................... 219/131 R |
| 3,694,621 | 9/1972 | Wofsey ..................... 219/125 PL X |
| 3,775,582 | 11/1973 | Iceland......................... 219/125 PL |
| 3,777,115 | 12/1973 | Kazlauskas et al.............. 219/125 R |

*Primary Examiner*—Arthur T. Grimley
*Assistant Examiner*—Clifford C. Shaw
*Attorney, Agent, or Firm*—Oblon, Fisher, Spivak, McClelland & Maier

[57] ABSTRACT

A method and an apparatus for non-consumable electrode type automatic arc welding in which the length of an arc produced between a non-consumable electrode and a workpiece which is being welded, is automatically controlled to an optimum value by means of an electric drive motor for driving an electrode according to a signal obtained by proportionally integrating or multiplying the voltage difference between the arc voltage detected by using an integrating element and the set reference voltage.

4 Claims, 21 Drawing Figures

METHOD AND APPARATUS FOR NON-CONSUMABLE ELECTRODE TYPE AUTOMATIC ARC WELDING

BACKGROUND OF THE INVENTION

1. Field of the Invention

This invention relates to a method and an apparatus for non-consumable electrode type automatic arc welding, in which an arc length is automatically adjusted to an optimum value.

2. Description of the Prior Art

In non-consumable electrode type automatic arc welding, it is imperative that the length of an arc be maintained constant, despite the type of movement of the torch or shape of the weld grove, to thereby obtain uniform melting of a filler wire which is automatically fed, such that uniform quality of the weldment is obtained. More particularly, it is desired when utilizing non-consumable electrode type automatic arc welding that the torch is caused to weave or oscillate in all positions in order to obtain flat beads and to minimize internal defects. However, unless the arc length is accurately controlled, there will result variation in the arc length due to the irregularity of surface conditions of a weld groove and that of an underlaid bead. Variation in the arc length can also result due to variation in the spacing between the torch and workpiece being welded during the weaving operation of the torch. Thus, in the event that the arc length is too short, there will arise the possibility of short-circuiting between a non-consumable electrode and a workpiece being welded, damage to the electrode or deposition of the material of the electrode into the weld. In addition, due to variation in the arc length, i.e., variations in current density of an arc and in the cross-sectional area of an arc relative to that of a molten pool or a weld puddle, stable penetration of the weld may not be obtained, and uniform bead formations may not be obtained resulting from non-uniform formation of puddles of the weld. Still further, with non-consumable electrode type automatic arc welding, in which a filler wire is automatically fed, a minor variation in arc length will lead to a variation in the melting rate of a filler wire, such that there will result non-uniform formation of beads or immersion of the filler wire into a weld puddle due to an unbalanced feed rate of the filler wire with respect to its melting rate. The failure to effect normal transfer or shifting of the molten metal in droplet form from a filler wire to a weld puddle or molten pool, may result due to too high a feed rate of the filler wire in the cases of overhead or vertical position welding.

It follows that in the case of non-consumable electrode type automatic arc welding, particularly when weld weaving in all positions is is used, it is highly desirable to maintain the arc length accurately constant, and thus such a control system is urgently desired.

To this end, there has been proposed in a Japanese Patent Publication (1969 - 1822), that an arc voltage is detected and amplified so as to move an electrode in a vertical direction, thereby maintaining the arc length constant. This attempt is to provide a control system in which a proportional characteristic affording a dead zone of an arc voltage is maintained between the arc voltage and the voltage fed to the electric motor adapted to drive a welding electrode, thereby eliminating the hunting of the electric motor.

With such prior art control systems, there result three disadvantages in that the stabilized point of an arc voltage returning when the arc voltage is lowered and the stabilized point returning when the arc voltage is raised will necessarily lead to the stoppage of the electric motor in different positions within such a range of the arc voltage, in that the electric motor fails to respond to such a voltage, or in that the stabilized points will not remain at a given point due to the variations in an arc voltage and due to the fact that the control distance of the electric motor varies with the varying impressed voltages. In addition, with a control system wherein such a stabilized operating point is not definite with respect to its position within the aforesaid non-responsive range or dead zone, difficulties are encountered with adjustment of the set arc voltage. Moreover, the responding capability of a control system to the variation in arc voltage will be lowered to an extent corresponding to the aforesaid non-responsive range or dead zone.

Thus, such an arc control system in non-consumable electrode type automatic arc welding fails to meet the requirements of accurate welding, all position welding and welding by weaving or oscillating a torch, as are used for welding of high alloy steels, mild steels and low alloy steels. Also, such a system cannot obtain uniform melting of a filler wire with resulting high quality welds which require a well controlled arc length.

SUMMARY OF THE INVENTION

The present invention contemplates avoiding the aforesaid drawbacks experienced with the prior art non-consumable electrode type automatic arc welding.

It is accordingly an object of the present invention to provide a method and an apparatus for non-consumable electrode type automatic arc welding, wherein an arc length is automatically controlled to a single optimum value for eliminating hunting of an electric motor, by maintaining the arc length constant and stable.

It is a further object of the present invention to provide a method and apparatus for non-consumable electrode type automatic arc welding, in which a well stabilized arc of a constant length may be maintained even in the case where the torch is weaved or oscillated.

It is a still further object of the present invention to provide a method and apparatus for non-consumable electrode type automatic arc welding, wherein an arc length is controlled, with a torch being oscillated or weaved, yet with the feed rate of the filler wire being controlled.

One further object of the invention is to provide a method and apparatus for non-consumable electrode type automatic arc welding, wherein an arc length is controlled, with the welding torch being oscillated or weaved, while the reference position of the welding torch is so controlled as to follow the predetermined welding line, with the feed rate of a filler wire being controlled.

According to a first aspect of the present invention, there is provided a method and apparatus for non-consumable electrode type automatic arc welding, wherein a drive electric motor for driving an electrode is operated by virtue of a signal obtained by proportionally integrating or multiplying the voltage difference between the arc voltage detected by using an integrating element and a set reference voltage, to automatically control the length of an arc produced between a non-consumable electrode and a workpiece which is being welded.

According to a second aspect of the invention, there is provided a method and apparatus for non-consumable electrode type automatic arc welding, wherein an arc length is controlled, with a welding torch being oscillated or weaved.

According to the third aspect of the invention, there is provided a method and apparatus for non-consumable electrode type automatic arc welding wherein the voltage obtained by detecting the voltage between an electrode and a filler wire or the voltage between a filler wire and a workpiece being welded is compared with a preset reference voltage, whereby the electric motor for feeding the filler wire may be controlled by virtue of a differential signal obtained thereby, for purposes of controlling the feed rate of the filler wire as well as the arc length, with a welding torch being oscillated or weaved.

According to a fourth aspect of the invention, there are provided a method and apparatus for non-consumable electrode type automatic arc welding, wherein in addition to the aforesaid control, a marking-off line in parallel with the center line of a weld groove (welding line) is marked on one side of the weld groove of a workpiece therealong, whereby the aforesaid marking-off line is detected by means of a photoelectric tube for effecting the gap control so as to maintain constant the spacing between the reference position of an electrode and a workpiece being welded, as well as for effecting a welding line control whereby to cause the reference position of the electrode to follow the welding line.

BRIEF DESCRIPTION OF THE DRAWINGS

Various other objects, features and attendant advantages of the present invention will be better understood from the following detailed description when considered in connection with the accompanying drawings wherein like reference characters designate like or corresponding parts throughout the several views, and in which.

DETAILED DESCRIPTION OF THE PREFERRED EMBODIMENTS

Figure 1:
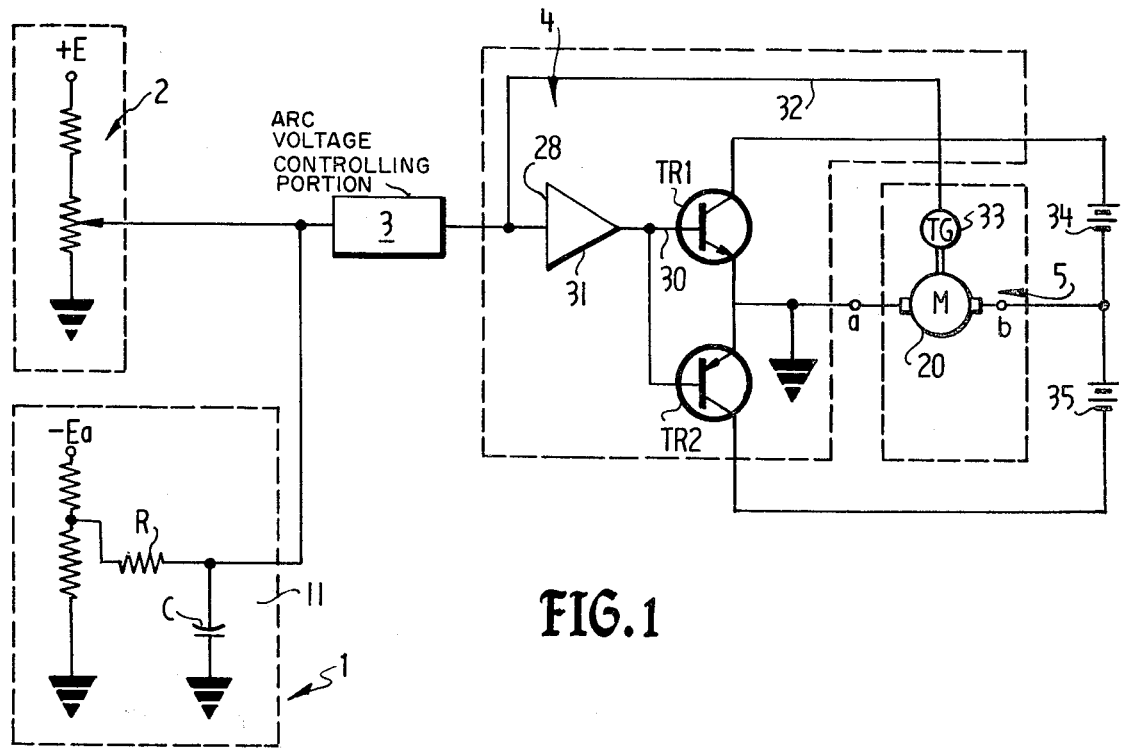
FIG. 1 is a block diagram of an arc length control circuit embodying the present invention.

Referring now to the drawings and more particularly to FIG. 1, an arc length control mechanism according to the present invention is illustrated as including an arc voltage detecting portion 1 having an integrating element 11; a reference voltage setting portion 2; an arc voltage controlling portion 3 for comparing the arc voltage with the operational reference voltage; an electric motor drive portion 4; and a drive portion for driving a non-consumable electrode by means of an electric motor in a longitudinal direction of a weldment, commensurate to an arc length.

The arc voltage detecting portion 1 detects arc voltage (−Ea) which in turn is stabilized by virtue of the integrating element 11 having a time constant greater than those of a high frequency component thereof and the responsive time of an electric motor. The integrating element 11 may be an integrator or an operational amplifier having an amplification degree suited for an input.

In the reference voltage setting portion 2, D.C. constant voltage (+E) is divided through a variable resistor, whereby a desired arc voltage i.e., a desired arc length, may be obtained by the set value.

Figure 2:
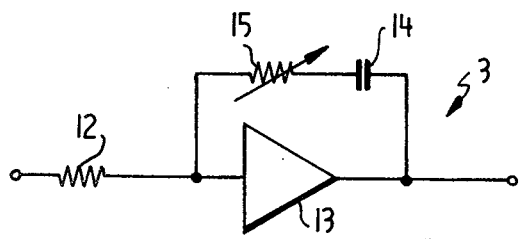
FIG. 2 is a circuit diagram of an arc voltage control portion embodying the present invention.

The arc voltage control portion 3 proportionally integrates and amplifies the voltage difference (which will be referred to as an error voltage hereinafter) between the output voltage in the arc voltage detecting portion 1 and the output voltage in the reference voltage setting portion 2. The arc voltage control portion uses therein a proportionally integrating amplifier having a resistor 12, an operational amplifier 13, and a feedback circuit including a condensor 14 and a gain adjusting variable resistor 15, as shown in FIG. 2.

The use of the proportionally integrating amplifier permits the feed of a signal to the electric motor drive control portion 4 in the next stage. The aforesaid signal is adapted to return the arc length to an optimum length even in the presence of a minor error voltage, because such minor voltage may be amplified and integrated in the proportionally integrating amplifier.

The electrode portion drive electric motor 20 may be braked so as not to cause overshooting beyond an optimum point, due to a combination of an integrating element 11 with an arc voltage controlling portion 3, thus eliminating hunting in the electric motor.

Figure 3:
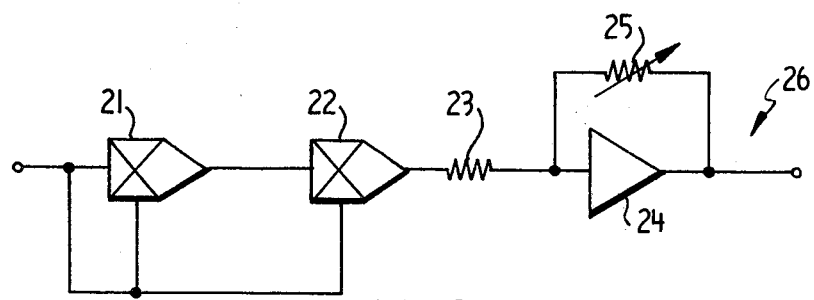
FIG. 3 is a circuit diagram of another embodiment of the arc voltage control portion according to the present invention.
Figure 4:
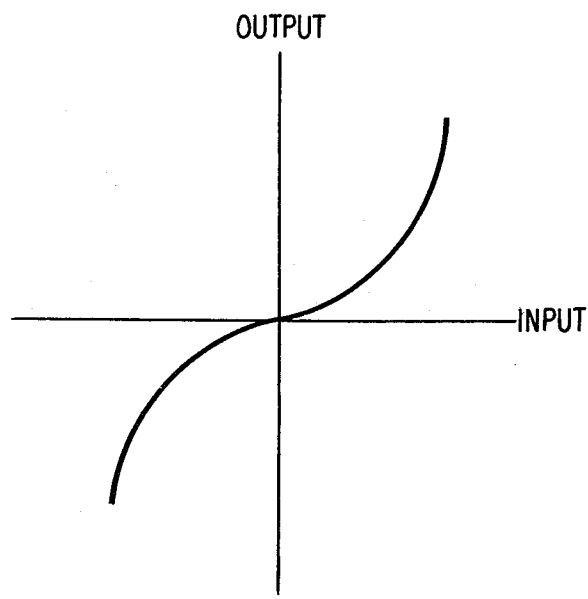
FIG. 4 is a plot illustrating input and output characteristics of the control circuit of FIG. 3.

On the other hand, the arc voltage control portion 3, as shown in FIG. 3, may be fed with an input and output which are '$n$'-th powered ($n = 2, 3, 4 \ldots$) by using multipliers 21 and 22. The arc voltage control portion 3 consists of the multipliers 21 and 22 connected in series, and a coefficient multiplier 26 consisting of an operational amplifier 24 and a variable resistor 25. The coefficient multiplier is positioned in the next stage of the aforesaid multiplier 22. The control portion 3 provides a tertiary curve characteristic, as shown in FIG. 4, representing the relationship between the error voltage (input) and the signal (output) to be fed to the electric motor drive control portion positioned in the next stage, for returning an arc length to the optimum value. In such a relationship the greater the error voltage, the greater will be the output signal to be fed to the electric motor drive control portion 4 in the next stage, whereby the motor may be immediately driven so as to bring an arc length to an optimum arc length. In this respect, the closer the arc length to the optimum value, the greater will be the braking action, and eventually the arc length will be settled at an optimum value. Since the smaller the error voltage the lesser the excessive output signal which is to be applied to the electric motor control portion 4 in the next stage, such that the electrode portion driving electric motor will not encounter hunting, even if the porportional integrating system incorporating the aforesaid timing element is not used.

The electric motor drive control portion 4, as shown in FIG. 1, amplifies an output signal of the arc voltage control portion 3, and brakes the electrode-portion driving electric motor so as not to cause overshooting, but to permit normal or reversed rotation of the electrode portion driving electric motor, depending on a positive or negative signal thus amplified. The electric motor drive control portion 4 consists of an operating element 28 and a polarity determining element 30 in the next stage.

The operating element 28 consists of an operational amplifier 31 and a feedback element 32 adapted to negatively feedback to the input side of the operational amplifier 31 the output from the tachometer generator 33 adapted to generate the output voltage in proportion to R.P.M.s of the electrode-portion driving electric motor. The feedback element 32 eliminates an output variation in the electric motor 20 caused by the variation in load in the electrode-portion driving electric motor 20.

Figure 5:
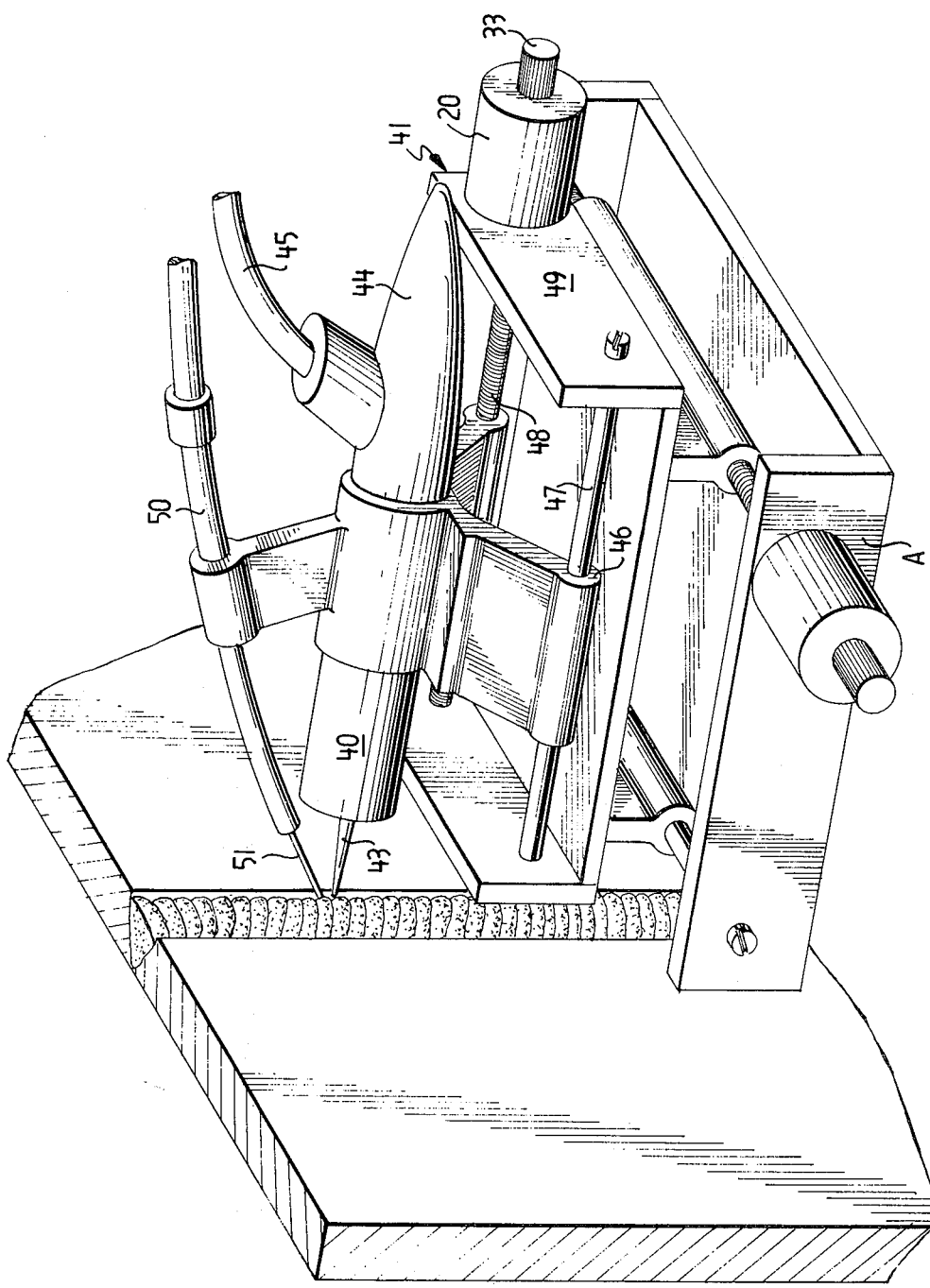
FIG 5 is a perspective view of a drive portion according to the present invention.

The polarity determining element 30 consists of a 'npn' transistor Tr1 and a 'pnp' transistor Tr2, with the base terminals of the transistors Tr1 and Tr2 being connected to the output terminal of the operational amplifier 31. The collector terminal of the transistor Tr1 is connected by way of an electric power supply 35 to the '$b$' terminal. The emitter terminal of the electrode-portion driving electric motor is grounded at the terminal '$a$'. When a signal in a positive direction is fed to the polarity determining element 30, the transistor Tr1 will conduct, and the electrode portion driving electric motor 20 will rotate in a positive direction. When a signal in a negative direction is fed to the polarity determining element 30, then the transistor Tr2 will conduct, whereupon an electric current will flow through the electric motor from the terminal '$b$' to the terminal '$a$', and hence the motor 20 will rotate in a reversed direction. The drive portion 5 includes an electrode portion 40 and an electrode portion drive mechanism 41. As shown in FIG. 5, the electrode portion 40 includes a non-consumable electrode 43 and an insulating body 44 holding the electrode 43 therein. The non-consumable electrode 43 is connected, via a lead conductor running through the insulating body, to a welding cable 45. The electrode-portion drive mechanism 41 includes an electrode supporting arm 46, a guide cover 47 adapted to guide the arm 46, a screw 48 adapted to drive the arm 46 in a longitudinal direction, and a frame body 49 supporting the guide cover 47 and screw 48 thereon. The electrode portion supporting arm 46 has three arms. A first arm supports the electrode portion 40 as well as a filler wire guide tip 50 at a suitable angle to the non-consumable electrode 43. A second arm is formed with a slide hole having a diameter suited for sliding on a guide cover 47. A third arm has a female-threaded hole in meshing relation to the screw 48. The screw 48 is coupled to a rotary shaft of the electrode-portion driving electric motor 20. Running through the filler wire guide tip 50 is a filler wire 51. The frame body 49 is connected to a weaving mechanism A, whereby the non-consumable electrode 43 is weaved or oscillated by way of the frame body 49 in a lateral direction.

The drive portion 5, thus arranged, travels according to a suitable travelling mechanism such as welding-line following a profiling mechanism to be described hereinafter.

With such an arrangement, the arc voltage is detected by means of an integrating element having a time constant greater than that of the responsive speed of the electric motor or that of the high frequency component thereof. The voltage difference between the output of the integrating element and the set reference voltage is then fed as an input to a proportional integrator or to a multiplier to obtain a signal for driving the electric motor, such that the electrode-portion driving electric motor will not cause hunting and will operate so as to bring the arc length to an optimum set arc length. As a result, according to the non-consumable electrode type automatic arc welding of the present invention, the arc length may be rapidly set to a single set value, irrespective of the misalignment of a weld line and irregularity of the surface condition of a weld groove. Thus safe protection for the electrode as well as uniform melting of a filler wire and high quality of welds is assured. Thus, non-consumable electrode type automatic arc welding for high alloy steels in addition to mild steels and low alloy steels or non-ferrous metals, or the automatic arc welding by weaving a torch may be achieved in an accurate manner.

Description will be given as to the filler-wire feed rate control method according to the present invention.

Figure 6C:
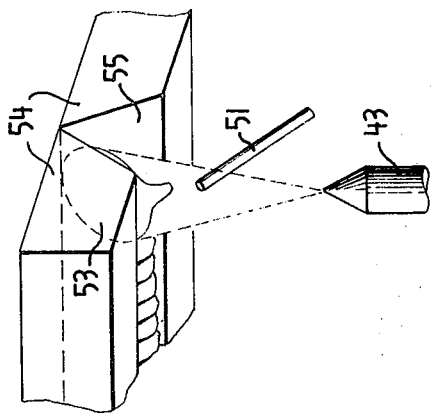
FIGS. 6(a) 6(b) and 6(c) are explanatory views showing the transfer or shifting condition of a molten metal from a filler wire to a weld puddle or molten pool, when the feed rate of the filler wire is optimum.
Figure 6B:
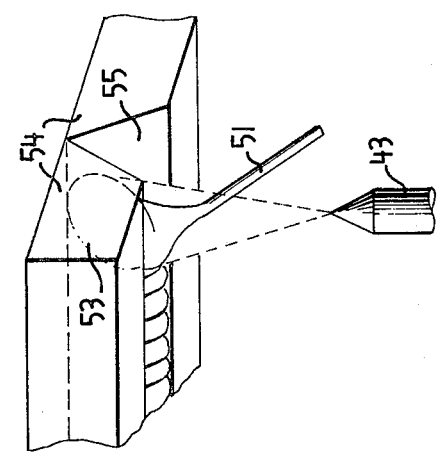
Figure 6A:
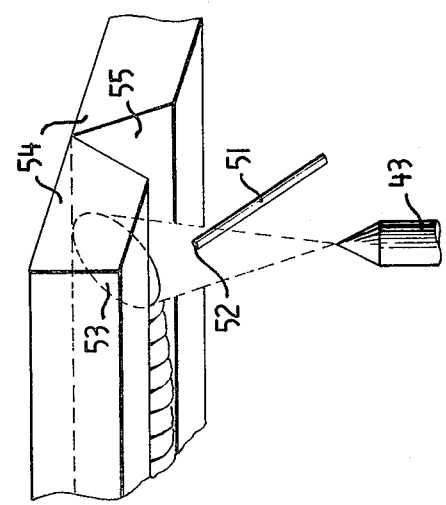

As shown in FIG. 6, the molten metal 52 formed in an arc at the tip of a filler wire 51 at first assumes the form of a droplet, then bridges over the molten pool 53 and filler wire 51 and then is attracted to the molten pool or weld puddle 53 to join therewith due to the force of the arc and the surface tension of the molten metal 52. This is a normal and hence a desirable condition.

Figure 7:
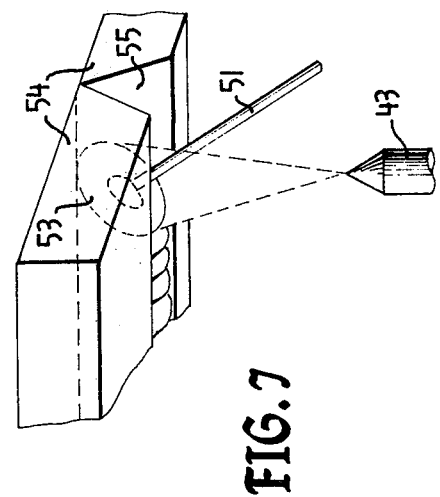
FIG. 7 is an explanatory view illustrating the transfer or shifting condition of a molten metal from a filler wire to a weld puddle, when the feed rate of a filler wire is relatively high.

FIG. 7 illustrates the case where the feed rate of the filler wire is relatively high, in which the filler wire 51, without being sufficiently melted, is forced into the molten pool 53 to thereby lower the temperature of the molten pool 53, with the resulting imperfect penetration.

Figure 8:
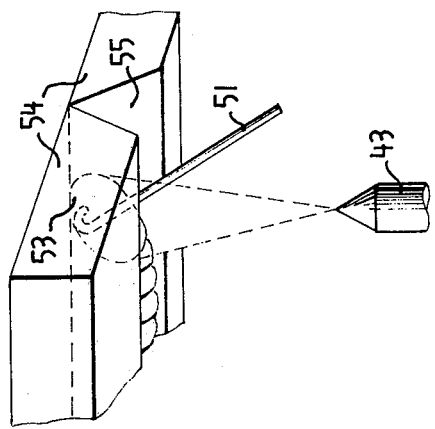
FIG. 8 is an explanatory view of the transfer or shifting condition of a molten metal from a filler wire to a weld puddle, when the feed rate of a filler wire is too high.

In case the feed rate of a filler wire is too high, the filler wire 51, as shown in FIG. 8, will impinge on the solid metal surface at the bottom of the molten pool 53, thereby causing vibration in the welding machine, whereby the welding operation has to be interrupted.

Figure 9C:
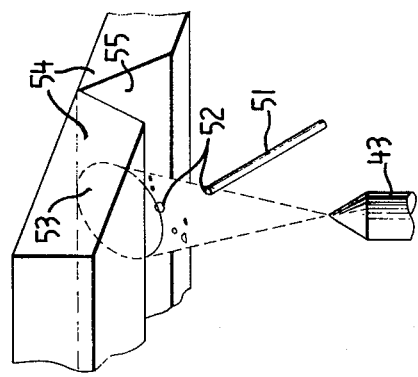
FIGS. 9(a), 9(b) and 9(c) are explanatory views of the transfer or shifting condition of a molten metal from a filler wire to a weld puddle, when the feed rate of a filler wire is relatively low.
Figure 9B:
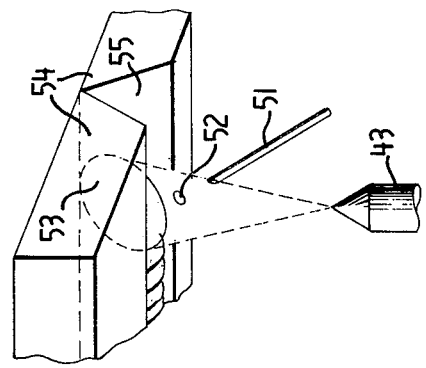
Figure 9A:
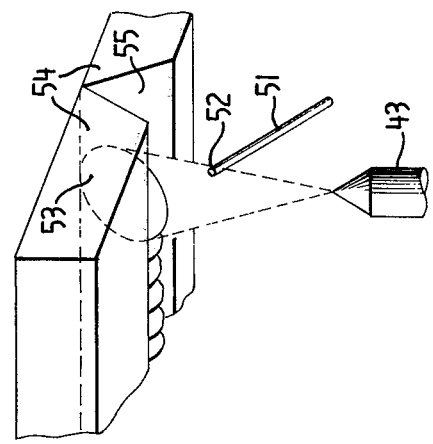

FIG. 9 illustrates the case where the feed rate of a filler wire is relatively low, the molten metal in a droplet form is detached from the filler wire 51 due to an arc force towards the molten pool 53 to join therewith. This causes vibration in the molten pool due to the impingement of the molten metal thereon with resultant sputtering.

Figure 10:
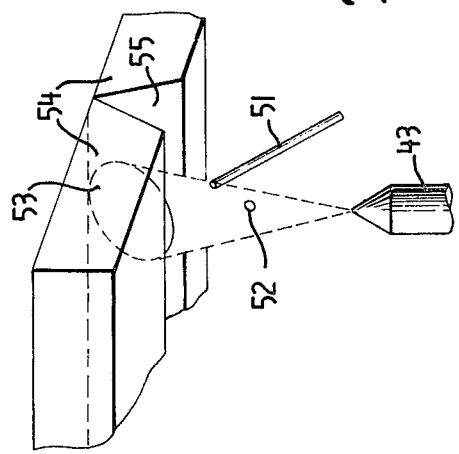
FIG. 10 is an explanatory view of the transfer or shifting condition of a molten metal from a filler wire to a weld puddle, when the feed rate of a filler wire is too low.

In case the feed rate of a filler wire is lowered further than in the former case, the molten metal 52 in a droplet form, as shown in FIG. 10, fails to reach the molten pool 53 and drops on an electrode or tooled nozzle or the like, thereby damaging the electrode or torch, resulting in interruption of the welding. As is clear from the foregoing, it is mandatory to control the feed rate of a filler wire 51 to a suitable value.

In a study by the inventors, it was revealed that the shifting condition of the molten metal 52 from a filler wire 51 to the molten pool 53 is dependent on the feed rate of the filler wire, while the feed rate of the filler wire is dependent on the voltage $E_{fb}$ between the filler wire 51 and a workpiece being welded or the voltage $E_{ef}$ between the electrode 43 (non-consumable type) and the filler wire 51. Thus, based on such discoveries, the filler wire feed rate is controlled according to a signal obtained from the aforesaid voltage $E_{fb}$ for achieving an optimum welding condition, as is shown in FIG. 6.

Figure 11:
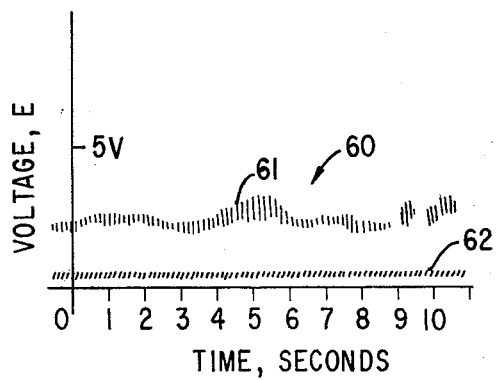
FIG. 11 is a graph showing variation in voltage between a filler wire and a work being welding at varying time, in case the feed rate of a filler wire is optimum.
Figure 12:
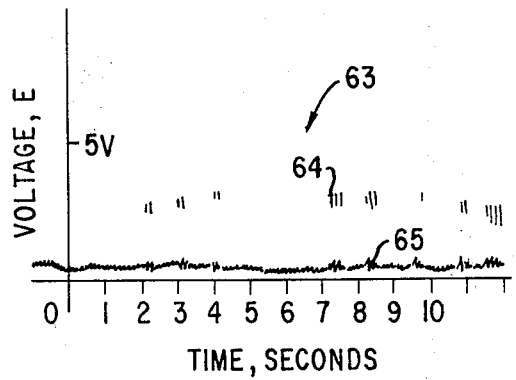
FIG. 12 is a graph showing variation in voltage between a filler wire and a workpiece being welded at varying time, in case the feed rate of a filler wire is relatively high.
Figure 13:
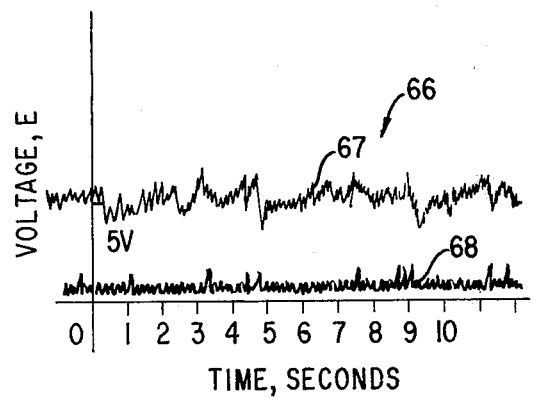
FIG. 13 is a graph showing variation in voltage between a filler wire and a workpiece being welded at varying time, in case the feed rate of the filler wire is relatively low.

FIGS. 11 to 13 show graphs of oscillographs 60, 63, 66 representing the rate of voltage $E_{fb}$ between the filler wire 51 and the workpiece 54, with the shifting conditions of the molten metal 52, as shown in FIGS. 5 to 10, being classified into three cases, i.e., (i) where the feed rate of the filler wire is optimum, (ii) where the feed rate of a filler wire is high and (iii) where the feed rate of a filler wire is low. The electrode 43 of a non-consumable type was used, and an arc of 250A and 13V was produced, the diameter of the filler wire 51 being 1.6 mm.

FIG. 11 refers to the aforesaid case (i). Until the molten metal 52 in a droplet form has reached a workpiece being welded, the aforesaid voltage $E_{fb}$ remains in a high voltage position 61. When the molten metal 52 bridges over the filler wire 51, and the workpiece 54 is being welded, the voltage $E_{fb}$ will then be brought to a low voltage position. When the molten metal 52 is attracted to the molten pool 53 to join therewith and thus the filler wire 51 is detached from the workpiece 54 being welded, voltage $E_{fb}$ will then be raised to a high voltage position 61. The aforesaid cycle of operation is repeated, thus producing the graph shown in FIG. 11. The mean value $E_{fb1}$ of voltage $E_{fb}$ in a high voltage position 61 is about 3 V.

FIG. 12 refers to the aforesaid case (ii). Because of the high feed rate of filler wire 51, the filler wire remains longer in the sticking or immersed condition in the molten pool 53, such that voltage $E_{fb}$ remains almost in a low voltage position 65. In this case, the filler wire 51 is directly melted within the molten pool 53 and joins the pool 53. The mean voltage $E_{fb2}$ is about 0.6V, and thus the duration, during which the voltage remains in a high voltage position 64, is extremely short, thus almost presenting short-circuiting condition.

FIG. 13 refers to the aforesaid case (iii). Because of the low feed rate of the filler wire 51, the spacing between the filler wire 51 and the workpiece being welded is apt to be relatively longer, such that the high voltage position 67 will be higher than the high voltage position 61 shown in FIG. 11. As has been described, the molten metal 52 does not span over the filler wire 51 and the molten pool 53, but jumps over by means of an arc force from the filler wire to the molten pool, such that the duration, during which the voltage $E_{fb}$ remains in the low voltage position 68, will be relatively short. In this case, the mean voltage $E_{fb3}$ of the voltage $E_{fb}$ in the high voltage position 67 is about 6V. As compared with the cases shown in FIGS. 11 and 12, the duration during which the filler wire 51 and the workpiece being welded are bridged is extremely short, thus presenting an almost open condition.

Referring to oscillographs 60, 63 and 66, there is a considerable difference in potential between the low voltage position 65 of the voltage $E_{fb}$ in the case of short-circuiting and the high voltage position 67 of the voltage $E_{fb}$ in open condition. Accordingly, if the set voltage is in the range from 2 to 5V, then the open condition and short-circuiting condition may both be controlled by means of a suitable circuit by using the aforesaid set voltage as the reference voltage. After the set voltage has been set, the molten metal 4 may be controlled to a stabilized shifting condition, even if the welding voltage and current are subjected to variations. Furthermore, if the set voltage is variable, there may be obtained a controlled, stabilized shifting condition of the molten metal under any condition throughout the range of the ordinary welding voltages and currents.

Description has thus far referred to the voltage $E_{fb}$ between the filler wire 51 and the workpiece being welded. The filler wire feed rate control system of the present invention may also be applicable in a similar manner to the voltage between the electrode and the filler wire, because of the relationship given below:

(electrode-work voltage $E_{eb}$) = (electrode-filler wire voltage $E_{ef}$) + (filler wire-work voltage $E_{fb}$) = const.

Figure 14:
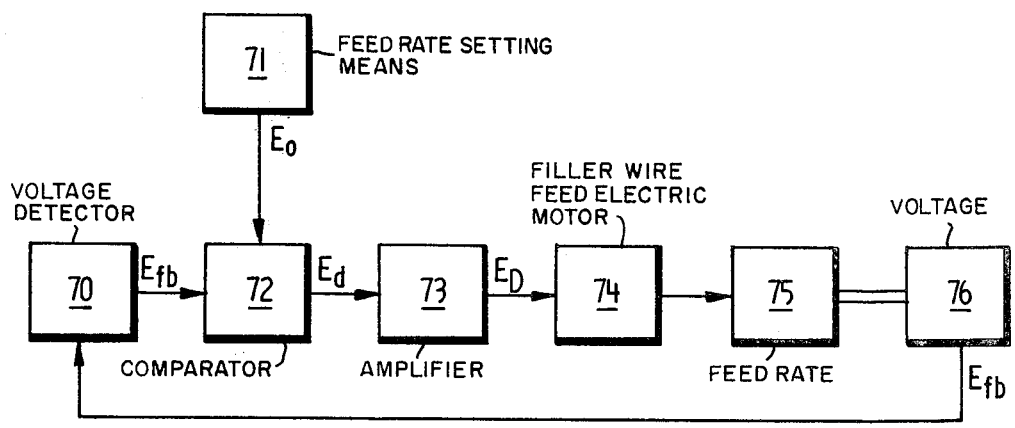
FIG. 14 is a block diagram of an apparatus practicing a filler wire feed rate control method embodying the present invention.

Turning now to FIG. 14, there is shown an apparatus for practicing the filler wire feed rate control method according to the present invention.

The voltage $E_{fb}$ between the filler wire 51 and the workpiece 54 is detected in a voltage detector 70 and fed into a comparator. The The voltage $E_{fb}$ is compared in the comparator 72 with the reference voltage $E_o$ appearing at the feed rate setting means 71 which presets the feed rate, and then the differential signal Ed is fed to an amplifier 73. The differential signal is amplified in the amplifier 73 and then fed as an operating signal $E_D$ to a filler-wire feed electric motor 74 which feeds a filler wire. The filler-wire feed electric motor 74 is controlled in a manner to nullify the differential signal Ed, such that the feed rate of the filler wire 51 may be maintained at the set feed rate at all times. As has been described, the feed rate 75 of the filler wire 51 will immediately appear as voltage 76 during the shifting of the molten metal 52 from the filler wire 51 to the molten pool 53, and thus the aforesaid voltage 76 will be $E_{fb}$ and detected in the voltage detector 70.

Meanwhile, the same results may be reached, if the voltage $E_{ef}$ between the electrode 43 and the filler wire 51 is used in place of the voltage $E_{fb}$ between the filler wire 51 and the work 54.

Owing to the relationship between the filler wire feed rate and the shifting condition of the molten metal 52 of the filler wire 51, the relationship between the aforesaid shifting condition and the voltage $E_{fb}$ between the filler wire 51 and the work 54 which has been clarified by the above referred relationship (or voltage between electrode 43 and filler wire 51), and the principle whereby to control the feed rate of the filler wire 51 by using voltage $E_{fb}$ as a signal, based on the aforesaid relationships, it will be apparent that a stabilized feed rate of a filler wire may automatically be obtained by the apparatus described thus far, with the resultant accurate control.

In addition, since the feeding of the filler wire 51 is carried out in synchronism with the shifting of a molten metal from the filler wire 51 to the workpiece 54, when the aforesaid shifting condition is turned into an open condition, the feed rate will immediately be accelerated to force the filler wire 51 into an arc. On the other hand, when the aforesaid shifting condition is turned into a short-circuiting condition, then the feed rate of the filler wire will immediately be slowed down to bring the shifting condition to an optimum level.

This controls the molten metal 52 in a droplet form so as to give a minimized size in the course of shifting from the filler wire to the workpiece 54, thus presenting high quality welds at a high efficiency.

Figure 15:
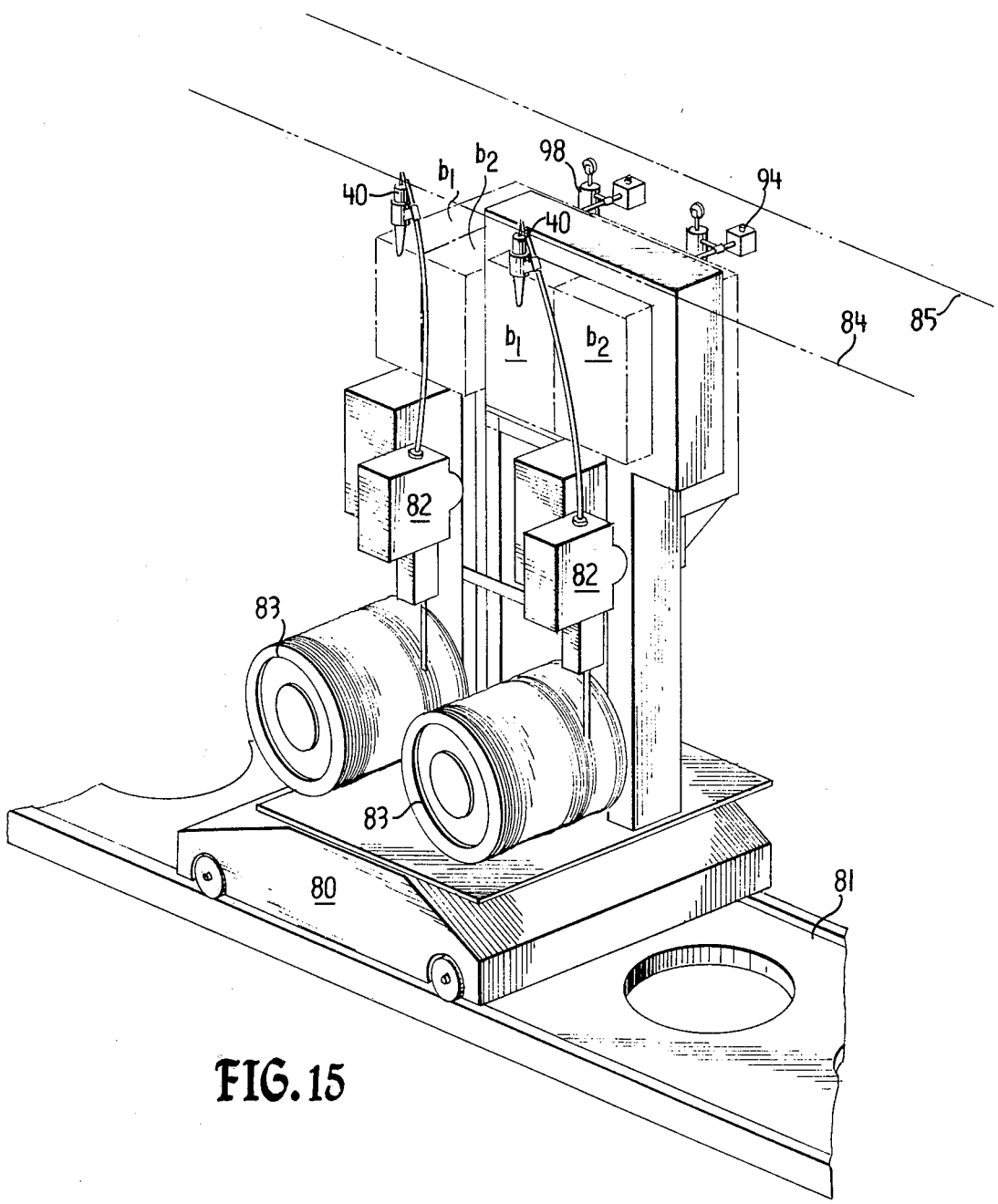
FIG. 15 is a perspective view of an apparatus embodying the present invention.

Description will now be given on the welding-line profiling or following mechanism. FIG. 15 refers to a perspective view of the entire apparatus according to the present invention which is used for overhead-position welding in a TIG welding process. Mounted on a platform 80, adapted to travel on rails 81 positioned below the welding line, are two sets of welding heads having electrode portions 40, 40, filler wire feeding means 82, 82 and filler wire reels 83, 83. The electrode portions 40, 40 are connected to the weaving mechanism and various profiling mechanism to be described hereinafter and are housed in a box $b_1$, shown by the dotted line, so as to automatically follow the welding line 84 as well as to accommodate variations in the welding conditions.

Figure 16:
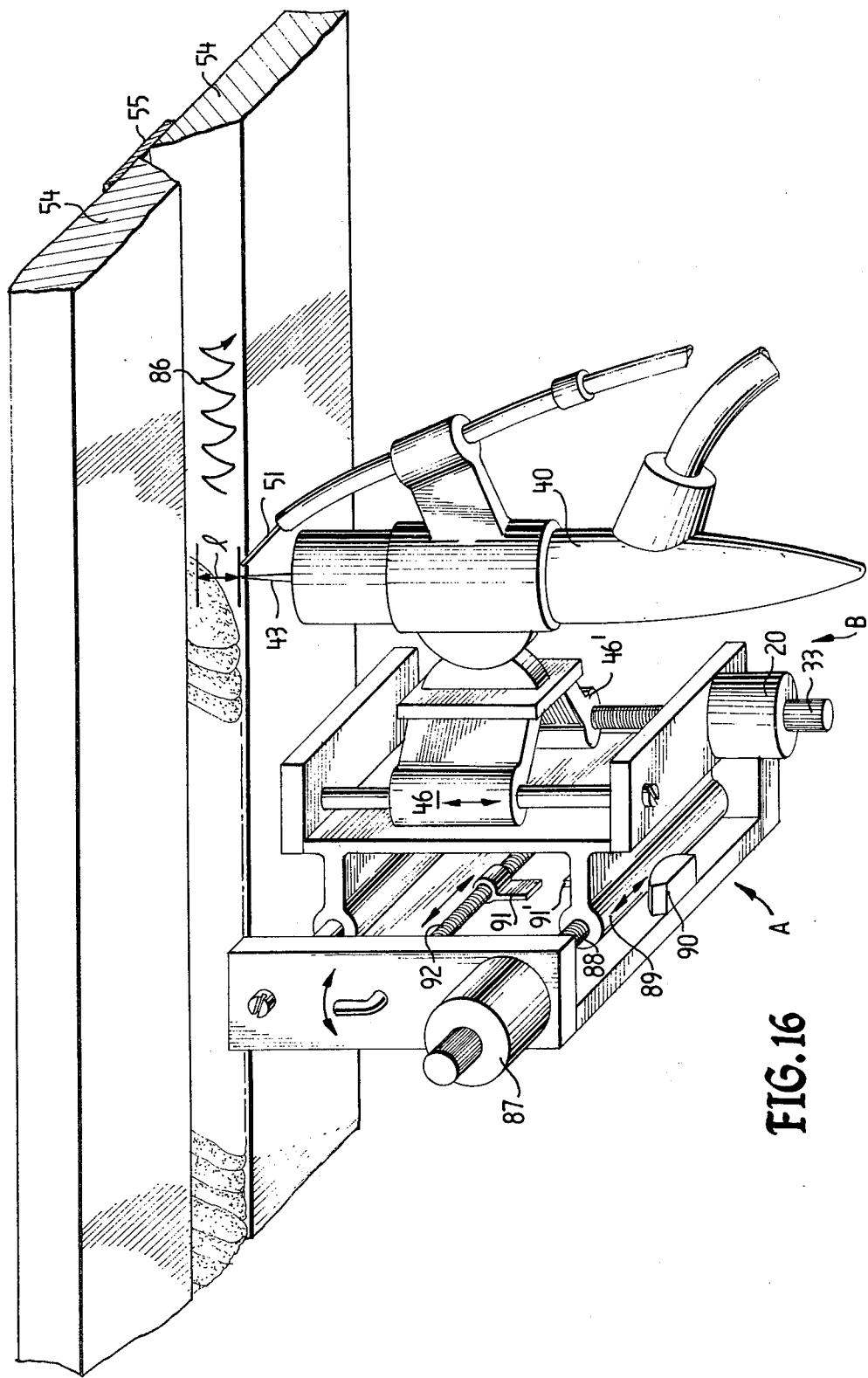
FIGS. 16 and 17 are detailed perspective views of mechanisms incorporated within boxes as shown in FIG. 15.
Figure 17:
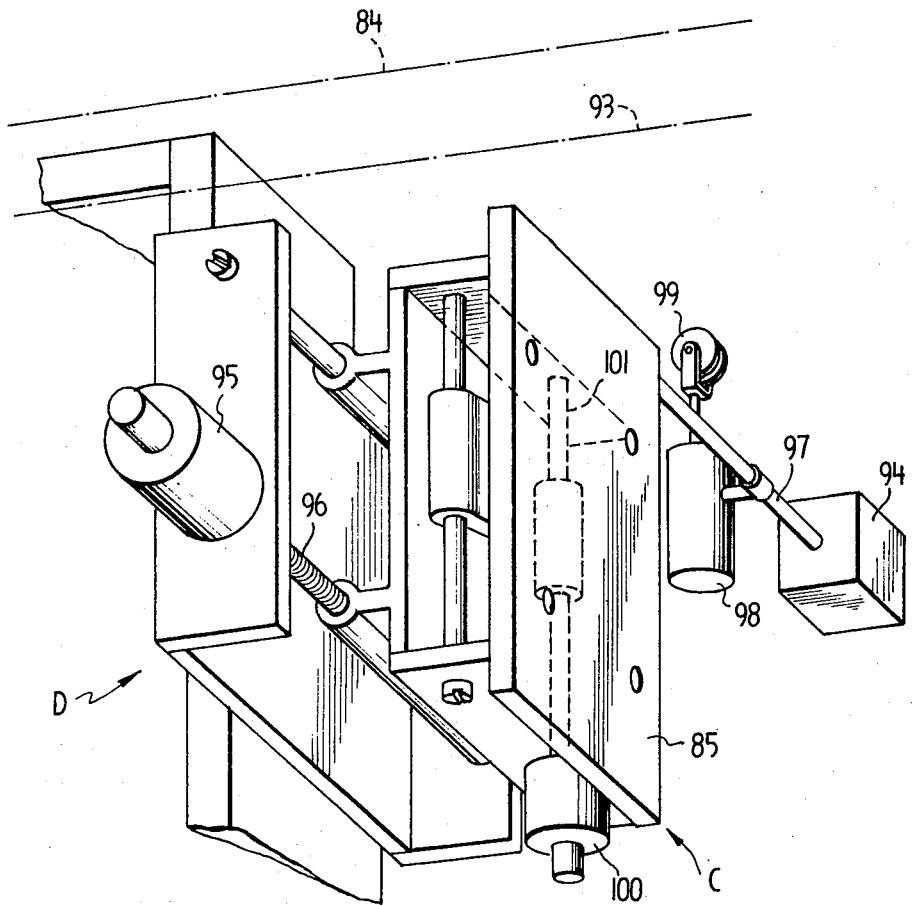

FIG. 16 is a detailed explanatory view of a weaving mechanism A and an arc length control mechanism B, which are both housed within the box $b_1$ shown in FIG. 15. FIG. 17 shows a gap control mechanism C and a welding-line profiling mechanism D, which are both housed in a box $b_2$, shown in FIG. 15. Those four mechanisms A to D are coupled to a welding torch (electrode portion) 40, with the weaving mechanism A, as shown in FIG. 16, being fixedly mounted on a plate 85 of the gap control mechanism C.

Now, description will be given as to the operation of various mechanisms of the welding apparatus thus arranged for a TIG welding process in an overhead position.

Firstly, a TIG welding torch 40 is set within the weld groove 55 of a workpiece to be welded. The filler wire 51 is then fed through a filler wire feeding means 82 from a filler wire reel 83, mounted on the platform 80 into an arc being produced between the non-consumable electrode 43 and the workpiece 54. A torch 40 is weaved for welding along the weaving locus or path 86, as shown. The weaving movement of the torch or electrode portion 40 is attended to by the weaving mechanism A. For this weaving motion of the electrode portion 40, the drive electric motor 87 in the weaving mechanism A is driven to rotate a screw shaft 88 for shifting the arc length control mechanism B which includes a welding torch (electrode portion 40) and supporting member 89 threadingly mounted on the aforesaid screw shaft 88. Provided in the center of the weaving motion is a center detecting means 90 which may issue a command to stop the weaving motion of the electrode portion 40 at the weaving center for a short time. Furthermore, the center detecting means 90 may also be used for adjusting the amplitude or width of the weaving motion. In this respect, the center detecting means 90 issues a command to reverse the rotation of the electric motor 87 for a certain period of time after the center of the supporting member 89 has passed through the front of the aforesaid detecting means 90. Meanwhile, the adjustment of the weaving motion may be effected by another separate mechanism. For instance, feelers 91, 91' of a limit switch adapted to issue a command to cause normal or reversed rotation for the electric motor 87 are attached to the screw shaft 92 as well as to supporting member 89, whereby the amplitude of the weaving motion may be adjusted by varying the contacting position of both feelers of the limit switch by rotating the screw shaft 92. In this respect, if the weaving motion of the electrode portion 40 is desired to be temporarily stopped for obtaining better penetration into the workpieces 54, 54 in the positions to effect normal and reversed rotations of the motor 87, i.e., in the opposite sidewise edges of the width of the weaving path or weaving locus 86, such commands may be issued by means of feelers 91, 91' of the limit switch. Thus, the welding may be carried out in the aforesaid manner under weaving motion. However, when the electrode position is fixed, there will result varying spacings between the non-consumable electrode 43 and the molten pool 53, i.e., the arc lengths between the center and the opposite sidewise edges of a weld groove, while in the case of multi-layer welding, the arc length may be varied, depending on the irregular surface of beads. Accordingly, a constant arc length should be provided.

The variation in arc length may be detected as the variation in arc voltage, such that, as has been described earlier, the arc voltage detected in the arc voltage detector is compared with a set voltage which has been set beforehand. Therefore, according to the comparison signal (error voltage), the electric motor 20 of the arc length control mechanism B may be rotated by way of the tachometer generator 33 to rotate the screw shaft 48, causing vertical movement of the electrode portion supporting arm 46' which is threadingly mounted on the aforesaid screw shaft, and eventually maintaining the space between the electrode 43 and the molten pool 53, i.e., the arc length '$l$' constant.

Misalignment of the electrode portion 40 with the welding line may possible be caused, if there is some minor difference between the travelling direction of the platform 80 underneath the workpiece 54, 54 and the welding line 84, as the welding proceeds. However, such misalignment may be adjusted by the welding profiling mechanism D. More particularly, a marking-off line 93 in parallel with the center line of the weld groove 55 is marked on one side of the weld groove of a workpiece therealong, in an attempt that a marking off-line detecting means 94 using a photoelectric tube may profile the marking-off line at all times. If the detecting means 94 comes off the marking-line, then the signal issued from the detecting means 94 will rotate the electric motor 95 and the screw shaft 96 which is directly connected to the electric motor 95, thereby moving the gap control mechanism C, and weaving mechanism A mounted on the plate 85 of the aforesaid gap control mechanism C, are length control mechanism B and welding torch (electrode portion) 40 in a direction at a right angle to the welding line, such that the marking-off line detecting means 94 may detect the marking-off line, i.e. the weaving center of the welding electrode portion 40 may be positioned in alignment with the center line of the weld groove.

Moreover, in case the spacings between the workpieces 54, 54 and the welding heads are not constant, for instance, in case the workpieces 54, 54 are inclined in the advancing direction of the welding or in case there is a bent portion in the welding line, then the gap control mechanism C will be operated. In other words, the tip roller of a differential transformer 98 provided on an arm 97 of the marking-off line detecting means 94 is maintained in sliding contact relation to the workpieces, such that when the spacing between the workpieces and the welding head varies, the differential transformer will detect the aforesaid variation to rotate an electric motor 100 of the gap control mechanism C as well as the screw shaft 101 coupled thereto in a manner to move the plate 85 in a vertical direction. This maintains the gap between the welding head and the workpiece constant, while the arc length may be maintained constant by means of the aforesaid arc length control mechanism, resulting in the achievement of a stabilized welding operation. In addition, the combined use of the filler wire feed rate control mechanism may present an optimum welding operation.

As is apparent from the foregoing description, the welding apparatus according to the present invention may correct the positional misalignment incident to the welding operation by means of the apparatus itself, such that defects such as imperfect penetration along the inner surface of a weld groove may be eliminated. In addition to this, the gap control for a gap between the welding head and the workpiece being welded as well as filler wire feed rate control permits continuous welding of a weldment having a considerable length, under highly stabilized welding conditions.

While description has been had with reference to the welding in vertical and overhead positions, the present invention may also be applied to the welding in flat or horizontal position.

While illustrative embodiments of the apparatus have been described, it will be understood that variations and modifications therein, within the scope and purview of the invention, will undoubtedly suggest themselves to those skilled in the art. Accordingly, the foregoing description should be construed merely as illustrative and not in a limiting sense.

What is claimed as new and desired to be secured by letters patent of the United States is:

1. A non-consumable electrode type automatic arc welding apparatus wherein an arc voltage is generated between a non-consumable electrode and a workpiece comprising:
   a non-consumable electrode;
   a workpiece;
   means for moving the electrode toward and away from the workpiece;
   a filler wire;
   means for feeding the filler wire toward the workpiece and the electrode;
   means for detecting the arc voltage comprising an integrating element;
   means for generating an arc reference voltage;
   means for detecting a difference between the arc reference voltage and the arc voltage to control in accordance therewith the means for moving the electrode toward and away from the workpiece to control the arc voltage and thereby control the arc length;
   means for detecting as the filler wire voltage the voltage between the filler wire and the electrode;
   means for generating a filler wire reference voltage;
   means for detecting a difference between the filler wire reference voltage and the filler wire voltage to control in accordance therewith the means for feeding the filler wire toward the workpiece and the electrode.

2. A non-consumable electrode type automatic arc welding apparatus in accordance with claim 1 further comprising means to subject the electrode to a weaving motion.

3. A non-consumable electrode type automatic arc welding apparatus wherein an arc voltage is generated between a non-consumable electrode and a workpiece comprising:
   a non-consumable electrode;
   a workpiece;
   means for moving the electrode toward and away from the workpiece;
   a filler wire;
   means for feeding the filler wire toward the workpiece and the electrode;
   means for detecting the arc voltage comprising an integrating element;
   means for generating an arc reference voltage;
   means for detecting a difference between the arc reference voltage and the arc voltage to control in accordance therewith the means for moving the electrode toward and away from the workpiece to control the arc voltage and thereby control the arc length;
   means for detecting as the filler wire voltage the voltage between the filler wire and the workpiece;
   means for generating a filler wire reference voltage;
   means for detecting a difference between the filler wire reference voltage and the filler wire voltage to control in accordance therewith the means for feeding the filler wire toward the workpiece and the electrode.

4. A non-consumable electrode type automatic arc welding apparatus in accordance with claim 3 further comprising means to subject the electrode to a weaving motion.

* * * * *